US007654353B2

United States Patent
Dubose et al.

(10) Patent No.: US 7,654,353 B2
(45) Date of Patent: Feb. 2, 2010

(54) WRAPPED-CONE FINGERS FOR SKIRT SYSTEMS

(75) Inventors: W. Keith Dubose, Pensacola, FL (US); Kirk A. Magnusen, Slidell, LA (US)

(73) Assignee: Textron Inc., Providence, RI (US)

( * ) Notice: Subject to any disclaimer, the term of this patent is extended or adjusted under 35 U.S.C. 154(b) by 316 days.

(21) Appl. No.: 11/469,412

(22) Filed: Aug. 31, 2006

(65) Prior Publication Data

US 2007/0056788 A1   Mar. 15, 2007

Related U.S. Application Data

(63) Continuation-in-part of application No. 10/832,198, filed on Apr. 26, 2004, now Pat. No. 7,290,631, and a continuation-in-part of application No. PCT/US2005/012127, filed on Apr. 11, 2005.

(51) Int. Cl.
    *B60V 1/16* (2006.01)
(52) U.S. Cl. .................. 180/121; 180/127; 180/128
(58) Field of Classification Search .......... 180/116, 180/117, 118, 119, 120, 121, 122, 124, 125, 180/126, 127, 128, 129, 130
    See application file for complete search history.

(56) References Cited

U.S. PATENT DOCUMENTS

| 3,362,499 | A |   | 1/1968  | Tripp |         |
|-----------|---|---|---------|-------|---------|
| 3,363,718 | A | * | 1/1968  | Hammett | 180/128 |
| 3,444,952 | A | * | 5/1969  | Clarke | 180/127 |
| 3,502,168 | A |   | 3/1970  | Jones |         |
| 3,532,180 | A | * | 10/1970 | Ford et al. | 180/126 |
| 3,643,758 | A | * | 2/1972  | Winter | 180/128 |
| 3,680,657 | A | * | 8/1972  | Marchetti et al. | 180/121 |
| 3,752,253 | A | * | 8/1973  | Hopkins et al. | 180/117 |
| 3,783,965 | A |   | 1/1974  | Wright |         |
| 3,921,753 | A |   | 11/1975 | Pont  |         |
| 3,964,698 | A |   | 6/1976  | Earl  |         |
| 4,042,060 | A | * | 8/1977  | Bertin et al. | 180/127 |

(Continued)

FOREIGN PATENT DOCUMENTS

FR        2362035        3/1978

(Continued)

*Primary Examiner*—Lesley Morris
*Assistant Examiner*—Marc A Scharich
(74) *Attorney, Agent, or Firm*—Garvey, Smith, Nehrbass & North, L.L.C.; Charles C. Garvey, Jr.; Seth M. Nehrbass

(57) ABSTRACT

Wrapped-cone fingers for use in an air-cushion vehicle (ACV) skirt system are described. Wrapped-cone fingers may include an inner cone that is "wrapped" or generally enclosed by an outer finger. The inner cone may include an inner cone opening through which air may travel. The outer cone may include a back face opening. When inflated, the inner cone blocks the back face opening in the outer finger, allowing for increased air pressure in the outer finger and thus inflating the inner cone and outer finger of the wrapped-cone finger. Wrapped-cone fingers according to the present invention may be lightweight, inexpensive and resistant to scooping and snagging. Embodiments are also directed to ACV skirt systems and methods of manufacturing wrapped-cone fingers for use with an ACV skirt system.

24 Claims, 17 Drawing Sheets

U.S. PATENT DOCUMENTS

| | | | |
|---|---|---|---|
| 4,046,216 A * | 9/1977 | Cook | 180/127 |
| 4,279,322 A | 7/1981 | Wheeler et al. | |
| 4,471,849 A * | 9/1984 | Herrouin et al. | 180/127 |
| 4,494,473 A * | 1/1985 | Simpson | 114/67 A |
| 4,646,866 A | 3/1987 | Bertrand et al. | |
| 4,924,958 A | 5/1990 | Yoshida et al. | |
| 5,119,897 A | 6/1992 | Moriwake | |
| 5,542,366 A | 8/1996 | Bell | |
| 5,560,443 A | 10/1996 | DuBose | |
| 5,931,248 A | 8/1999 | Vickers et al. | |
| 5,941,331 A | 8/1999 | Gastesi | |
| 7,290,631 B2 * | 11/2007 | DuBose et al. | 180/121 |
| 7,296,526 B1 * | 11/2007 | Dubose | 114/67 A |

FOREIGN PATENT DOCUMENTS

| | | |
|---|---|---|
| GB | 1109562 | 4/1968 |
| GB | 1179121 | 1/1970 |
| GB | 1191945 | 5/1970 |
| GB | 1208924 | 10/1970 |
| GB | 1215372 | 12/1970 |
| GB | 2203109 | 10/1988 |
| JP | 10044979 | 2/1998 |

* cited by examiner ated at the stern and stern corner locations of a skirt system, e.g., skirt system 100. Closed fingers 10b may include a closed loop or cone of flexible material, forming a substantially closed air cell or compartment.

The skirt bag 106 is typically inflated through ports or feed ducts that are supplied with air by one or more fans located on the deck 108. The fingers 110 are typically inflated with air from the skirt bag and/or air from the air cushion. Feed holes in the skirt bag may supply air to closed fingers. Open fingers are open to and receive a supply of air from the air cushion. Open fingers may also have local feed holes supplying air from the skirt bag to facilitate inflation.

FIG. 2 shows a profile of a prior art skirt system 200 including a skirt bag 202 connected to a portion of an ACV hull 206. A finger 204 is attached to the skirt bag 202. The direction of forward travel arrow 1 toward the bow of the ACV indicated. The finger 204 is shown as a conventional closed finger design and would normally be located at the stern or stern corners of a skirt bag. The finger 204 may include an inner face or edge 204a and a swept-back finger or cone portion 204b that is formed by the looped edge of the finger or cone material. The inner face 204a may face in a desired direction relative to the skirt and ACV hull, depending on the type of finger and its location on the skirt bag 202, e.g., toward the bow or towards the port and starboard directions (in FIG. 2 inner face 204a is a leading edge). The inner face 204a may form an angle 208 with the underlying terrain or sea surface 10 as shown. The finger 204 design shown may sometimes be referred to as a "swept-back cone" design, in reference to the finger resembling a cone of fabric or flexible material that has been cut in half.

With continued reference to FIG. 2, the stern finger 204 is attached to the skirt bag 202 at an attachment perimeter 214 (only one portion of the attachment perimeter is shown). One of skill in the art will understand that the attachment perimeter 214 will typically have an open-ended shape for an open finger design, e.g., in the shape of the letter "U" or an open oval shape. For a closed finger design, an aft panel forming a back face 204c would normally be included to seal the swept-back cone portion 204b.

FIGS. 3 and 7 show a profile of the prior art skirt system 200 of FIG. 2 with a conventional closed finger 204 that is in a collapsed position. Closed fingers 204 may collapse in certain situations, such as when a water wave or object 10 impacts the leading edge 204a of the finger 204. When the pressure and forces on the inner face 204a exceed the counter pressure and force of the air inside the finger 204, the inner face 204a can become turned inside out thereby creating a scoop 215, e.g., a concave surface with an included angle, as shown.

The creation of a scoop 215 is sometimes referred to as "scooping". When scooping occurs in one or more close fingers, large water-generated forces or water loads can result in a degradation in ACV performance and ultimately either a material or attachment structural failure to a finger and/or adjacent skirt structure. These types of failures are sometimes referred to as finger "blow-outs". Accordingly, FIG. 3 illustrates one problem associated with prior art stern fingers, e.g., finger 204.

FIGS. 4A, 4B, 8, 9 show a prior art ACV skirt system 400 with a finger 404 and planing element or stiffener 414. Planing elements or stiffeners, such as 414, have been used to prevent scooping and related problems, described above, for closed stern fingers or stern finger cones in certain applications. Planing element 414 is attached to a leading edge 404a of the closed finger 404. FIGS. 4A and 8 show the direction of forward movement (arrow 1) toward the bow of ACV and

WRAPPED-CONE FINGERS FOR SKIRT SYSTEMS

CROSS-REFERENCE TO RELATED APPLICATIONS

This is a continuation-in-part of U.S. patent application Ser. No. 10/832,198, filed Apr. 26, 2004, now U.S. Pat. No. 7,290,631 which is incorporated herein by reference. This is also a continuation-in-part of co-pending International Patent Application No. PCT/US2005/012127, filed Apr. 11, 2005, which is incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to air cushion vehicles. More particularly, the present invention relates to an improved cushion skirt construction for an air cushion vehicle. More particularly the present invention relates to an improved air cushion skirt system that employs multiple fingers wherein at least some of the fingers are of a wrapped construction that envelops an inner inflatable member with an outer finger that has an open back, the inner inflatable member nested within an interior of the outer finger next to the open back.

2. General Background of the Invention

Hovercraft or air-cushion vehicles (ACVs) are commonly used to transport passengers and cargo over variable terrain including water, snow, and land. ACVs typically use a skirt system to contain a volume of air, or "air cushion," which supports the weight of the vehicle during operation. An ACV skirt system commonly includes a skirt bag and multiple smaller cells or "fingers" that are adjacent to one another and located around the lower periphery of the skirt bag. The skirt bag forms a boundary or curtain around the perimeter of the ACV hull to contain the air cushion. The fingers help to form an air cushion seal between the skirt bag and the underlying terrain, e.g., land or water.

FIG. 1 shows a perspective view of the underside of a representative hovercraft or ACV including a prior art skirt system 100 with direction of forward travel arrow 1 toward the ACV bow indicated. The prior art skirt system 100 includes a peripheral bag or skirt bag 106 and fingers 110. The skirt bag 106 is attached to the periphery of the underside of an ACV hull 102. The hull 102 may be attached to a deck 108 as shown. The skirt bag 106 may include bow 106a, port 106b, stern 106c, and starboard 106d sections.

The design of a finger 110 may vary, depending on the location of a particular finger on the perimeter of the skirt bag 106. Different finger designs may help to maintain the air cushion as the ACV moves in various directions and over different types of surfaces and terrain. For example, an open-cone or open-finger design is commonly used for fingers 110a located at the bow section 106a and side sections 106b, 106d of the skirt bag 106. An open finger 110a may include an open loop or cone of flexible material that is attached to the peripheral bag 106 along a perimeter. For further example, a closed-cone or closed-finger design is commonly used for fingers relative to the underlying water or terrain 10 for forward motion of the ACV. FIGS. 4B and 9 show the ACV moving in a reversed direction relative to FIG. 4A, with the ACV movement arrow 3 and underlying terrain, e.g., water, movement indicated by arrow 4.

Stiffeners such as 414 may reduce the occurrence of scooping, however they may introduce other disadvantages for the associated skirt systems. Stiffeners are typically made from multiple bonded layers of skirt fabric or hard plastic. As a result of such construction, cones or fingers with stiffeners may be two to three (or more) times heavier than conventional open-finger designs. Additionally, fingers with stiffeners such as 414 may be more expensive than open-finger designs.

With particular reference to FIGS. 4B and 9, another notable problem associated with the use of stiffeners 414 may be seen. When an ACV having closed fingers 404 with leading edge stiffeners 414 backs up or moves to the stern, the planer element tip 414a can snag on the underlying terrain or water surface 10 as shown. Such snagging of the stiffener tip 414a may increase the moving resistance of the ACV and possibly result in damage to the finger 404 and adjacent structure of the skirt system 400. For example, flagellating remnants of a damaged or blown-out finger with stiffeners may cause damage to adjacent fingers or other portions of the associated skirt system.

FIG. 5 shows the underside of a stern corner of prior art ACV skirt system 500 having fingers with stiffening elements. The direction of water surface flow (arrow 2) is shown and represents the direction of water flow for normal forward motion of the related ACV. The skirt system 500 has a skirt bag (omitted for clarity) with attached fingers 502, 504, 506 including stern fingers 504 and stern corner fingers 506. The fingers 504, 506 include stiffening elements 504a, 506a located at the leading edges.

When stiffening elements 506a are used with stern corner fingers 506, the stiffening elements 506a may twist and undergo a displacement 506b, e.g., either up or down, due to the water surface flow 2 relative to the ACV. The twisting of the stiffeners 506a produces drag on the ACV and stress on adjacent fingers, e.g. stern corner fingers 506. Damage may occur to one or more of the adjacent fingers 506 as a result of such twisting and displacement (see arrow 506b).

Attempts have been made to reinforce stern corner fingers to withstand twisting stresses produced by the forces on stiffener elements. However, these efforts have had only marginal success at increasing finger life and have significantly increased the cost and weight of the fingers.

What are needed therefore are lightweight, inexpensive stern fingers for an air-cushion vehicle (ACV) that are resistant to scooping and snagging. What are further needed are related methods of manufacturing such stern fingers for use with ACV skirt systems.

BRIEF SUMMARY OF THE INVENTION

Embodiments of the present invention are directed to wrapped-cone fingers that are lightweight, inexpensive and resistant to scooping and snagging. Wrapped-cone fingers may include an inner cone that is "wrapped" or generally enclosed by an outer finger. Embodiments of the present invention are also directed to skirt systems and methods of manufacture wrapped-cone fingers for use with ACV skirt systems.

A first embodiment may include a wrapped-cone finger for an air-cushion vehicle (ACV) system. The wrapped-cone finger may include an outer finger having an outer finger surface having an outer finger opening. The outer finger may have an outer finger longitudinal axis. The wrapped-cone finger may include an inner cone placed in the outer finger. The inner cone may have an inner cone longitudinal axis. The wrapped-cone finger is operable to move from an inflated state where the outer finger opening is substantially blocked by the inner cone to a deflated state where the outer finger opening is not substantially blocked by the inner cone.

The inner cone may include an inner cone opening. The outer finger may include an outer finger attachment perimeter for connection to a skirt bag surface. The inner cone may include an inner cone attachment perimeter for connection to a skirt bag surface. The outer finger may be attached to a skirt bag surface. The outer finger may include a flexible material. The outer finger flexible material may be made of a suitable material such as nylon and may include an elastomer, such as for non-limiting example, natural rubber or rubber-coated fabric.

A second embodiment may include an air-cushion vehicle (ACV) skirt system that includes a skirt bag and a plurality of fingers attached to and depending from the skirt bag. The plurality of fingers includes one or more wrapped-cone fingers having an inner cone placed within an outer finger. Each of said one or more wrapped-cone fingers may include an outer finger having an outer finger surface having an outer finger opening. The outer finger may have an outer finger longitudinal axis. Each of the one or more wrapped-cone fingers may include an inner cone placed in the outer finger. Each wrapped-cone finger is operable to move from an inflated state where the outer finger opening is substantially blocked by the inner cone to a deflated state where the outer finger opening is not substantially blocked by the inner cone.

The inner cone of a wrapped-cone finger may include an inner cone opening. The outer finger may include an outer finger attachment perimeter for connection to a surface of a skirt bag. The inner cone may include an inner cone attachment perimeter for connection to a surface of a skirt bag. The outer finger may include a surface of the skirt bag. The outer finger may include a flexible material. The one or more wrapped-cone fingers may be located at a stern portion of the skirt bag. The one or more wrapped-cone fingers may be located at a stern corner portion of the skirt bag.

A third embodiment may include a method of manufacturing a wrapped-cone finger. An outer finger may be formed of flexible material. An inner cone may be formed of flexible material. The inner cone may be placed in the outer finger, thereby forming a wrapped-cone finger. The outer finger may be attached to a skirt bag. The step of attaching the outer finger to a skirt bag may include a step of releasably attaching the outer finger to the skirt bag. The step of attaching the outer finger to a skirt bag may include bolting or riveting the outer finger to the skirt bag. The inner cone may be attached to a skirt bag.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

The present invention may be understood by the following detailed description, which should be read in conjunction with the attached drawings. The following detailed description of certain embodiments is by way of example only and is not meant to limit the scope of the present invention.

Embodiments of the present invention are directed to wrapped-cone fingers for use in an air-cushion vehicle (ACV) skirt system. Wrapped-cone fingers according to the present invention may be lightweight, inexpensive and resistant to scooping and snagging. Wrapped-cone fingers may include an inner inflatable member or cone that is "wrapped" or generally enclosed by an outer finger. Embodiments of the present invention are also directed to skirt systems and methods of manufacturing wrapped-cone fingers.

Figure 1:
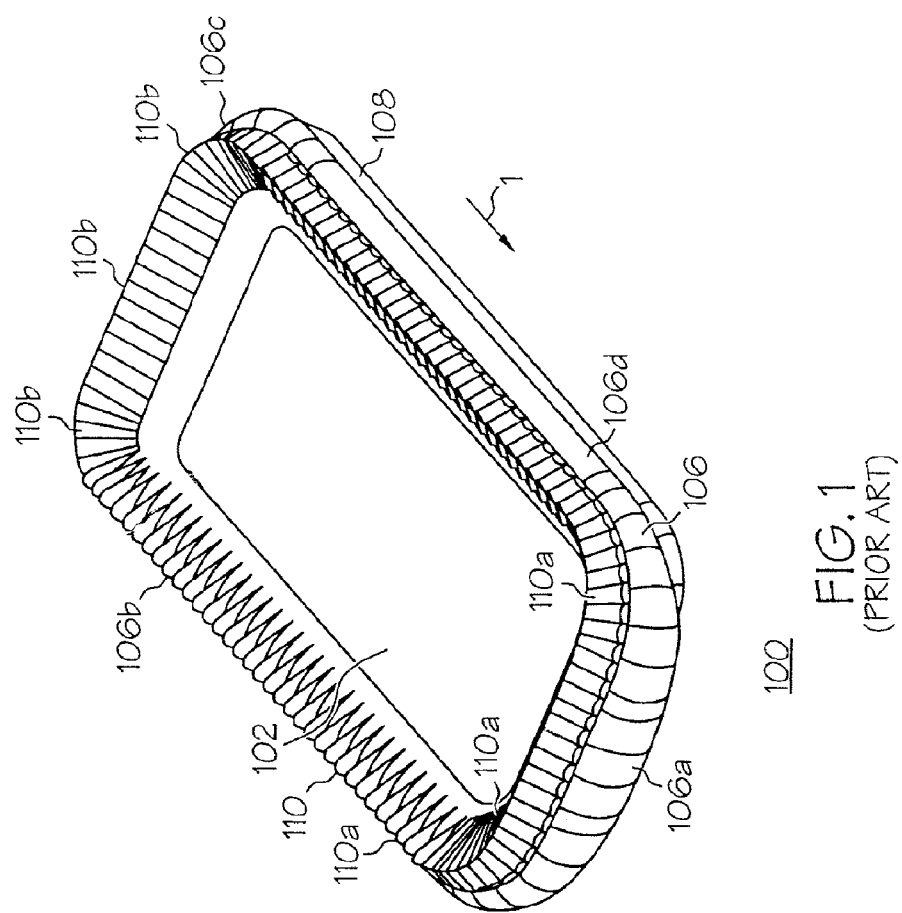
FIG. 1 shows a perspective view of the underside of a representative hovercraft with prior art air-cushion vehicle (ACV) skirt system.
Figure 2:
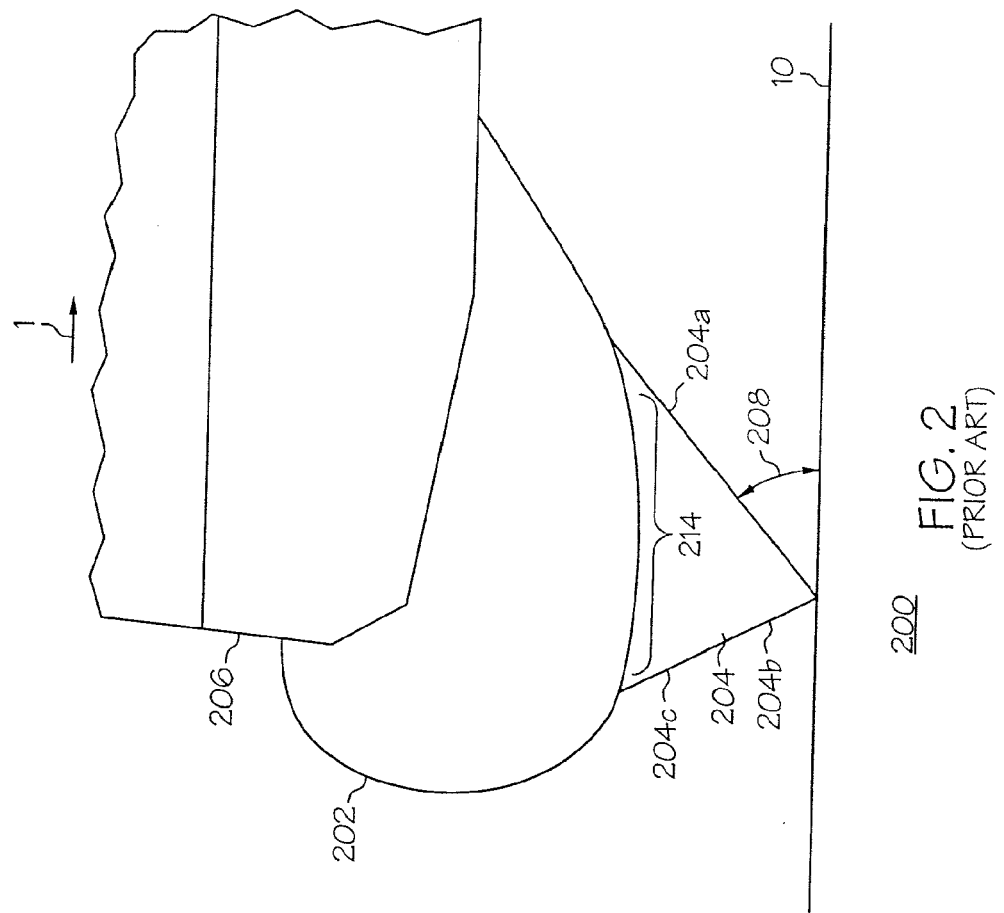
FIG. 2 shows a partial sectional elevation view of a prior art skirt system.
Figure 3:
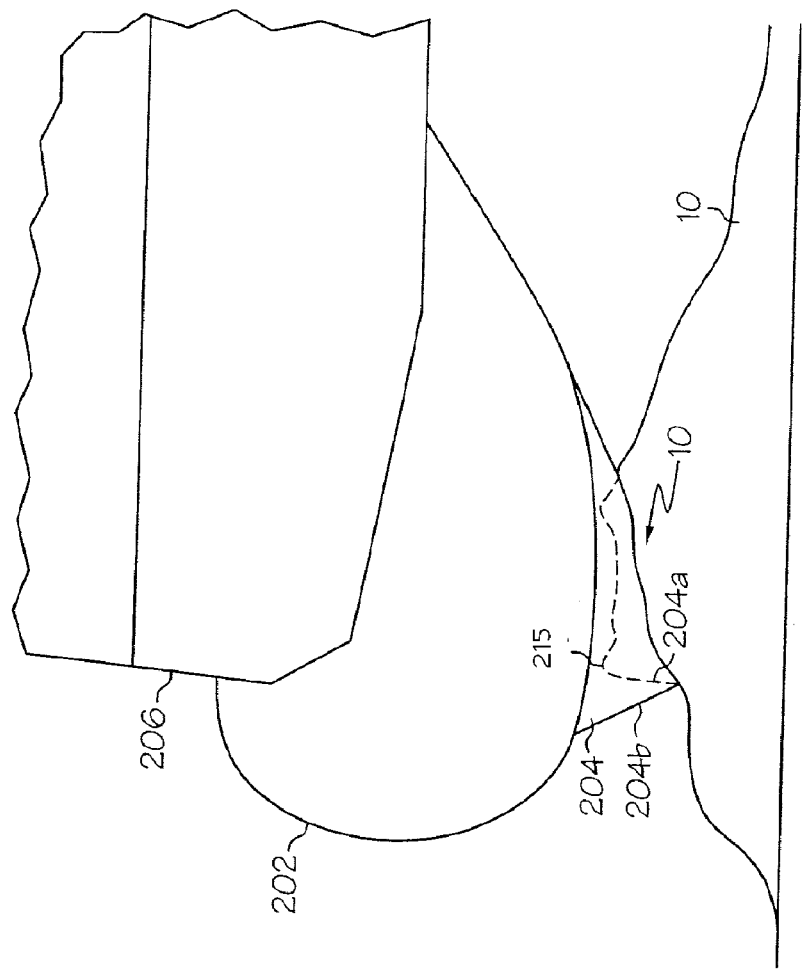
FIG. 3 shows a partial sectional elevation view of the skirt system of FIG. 2 with a conventional, prior art finger that is in a collapsed position.
Figure 4A:
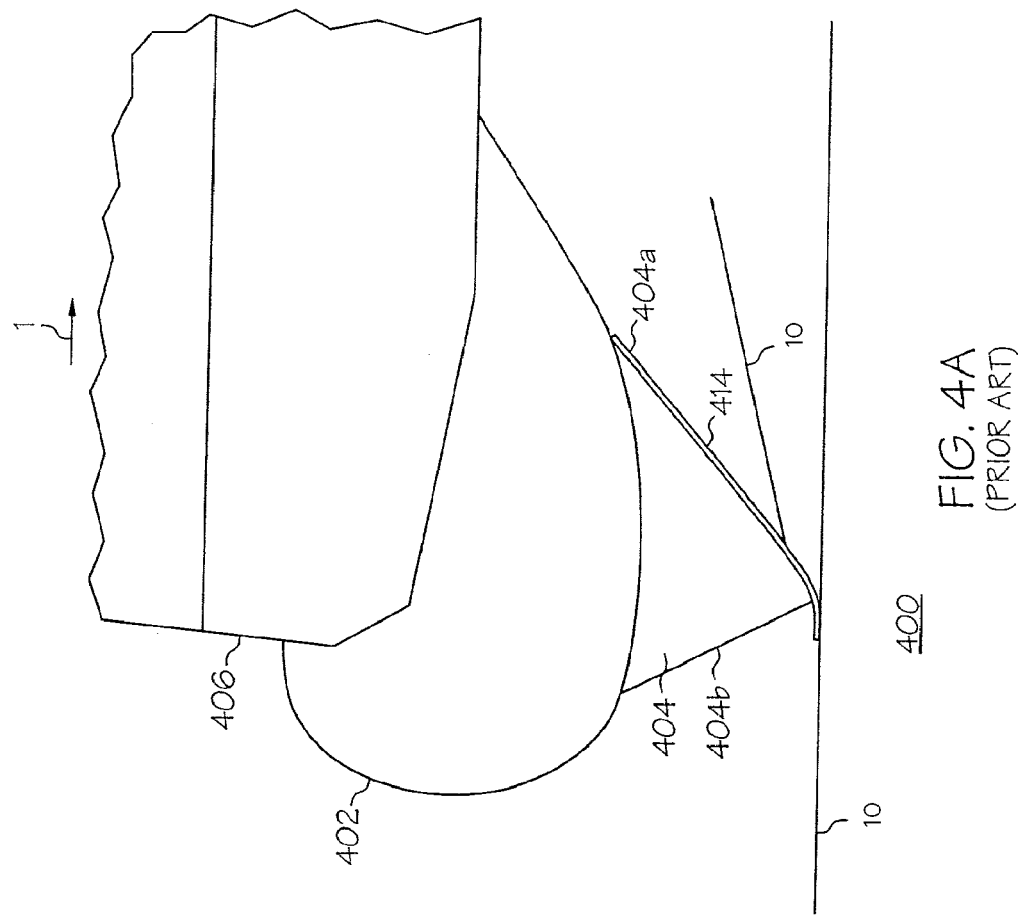
FIG. 4 shows two partial sectional elevation views, FIG. 4A and FIG. 4B, that show a prior art ACV skirt system with a finger and planing element or stiffener.
Figure 4B:
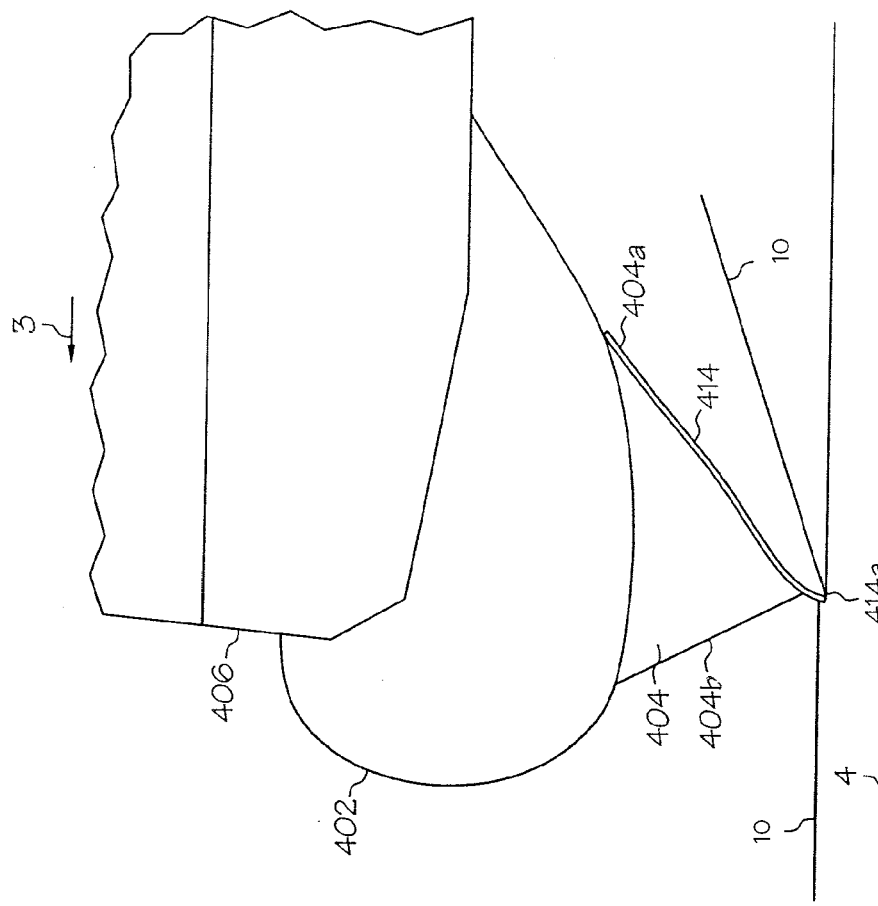
Figure 11:
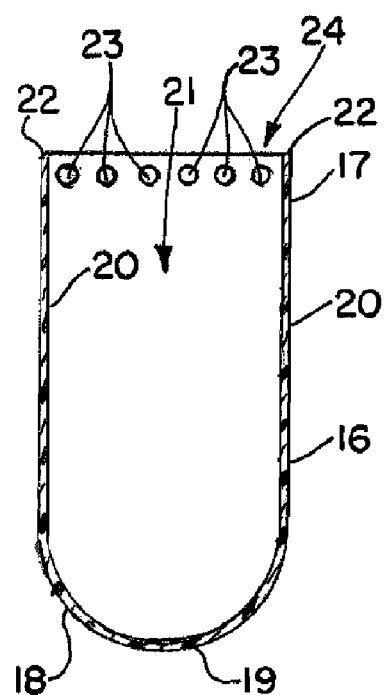
FIG. 11 is a sectional view taken along lines 11-11 of FIG. 10.
Figure 12:
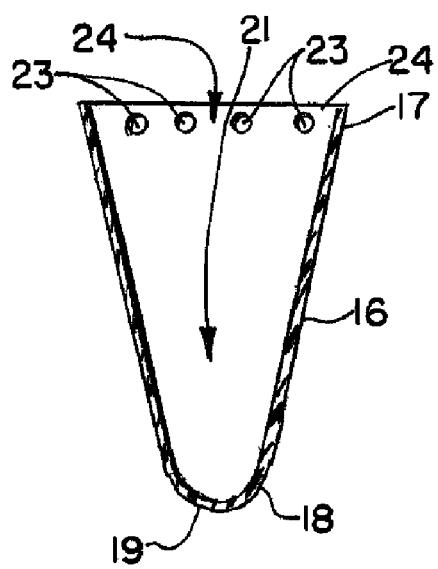
FIG. 12 is a sectional view taken along lines 12-12 of FIG. 10.
Figure 13:
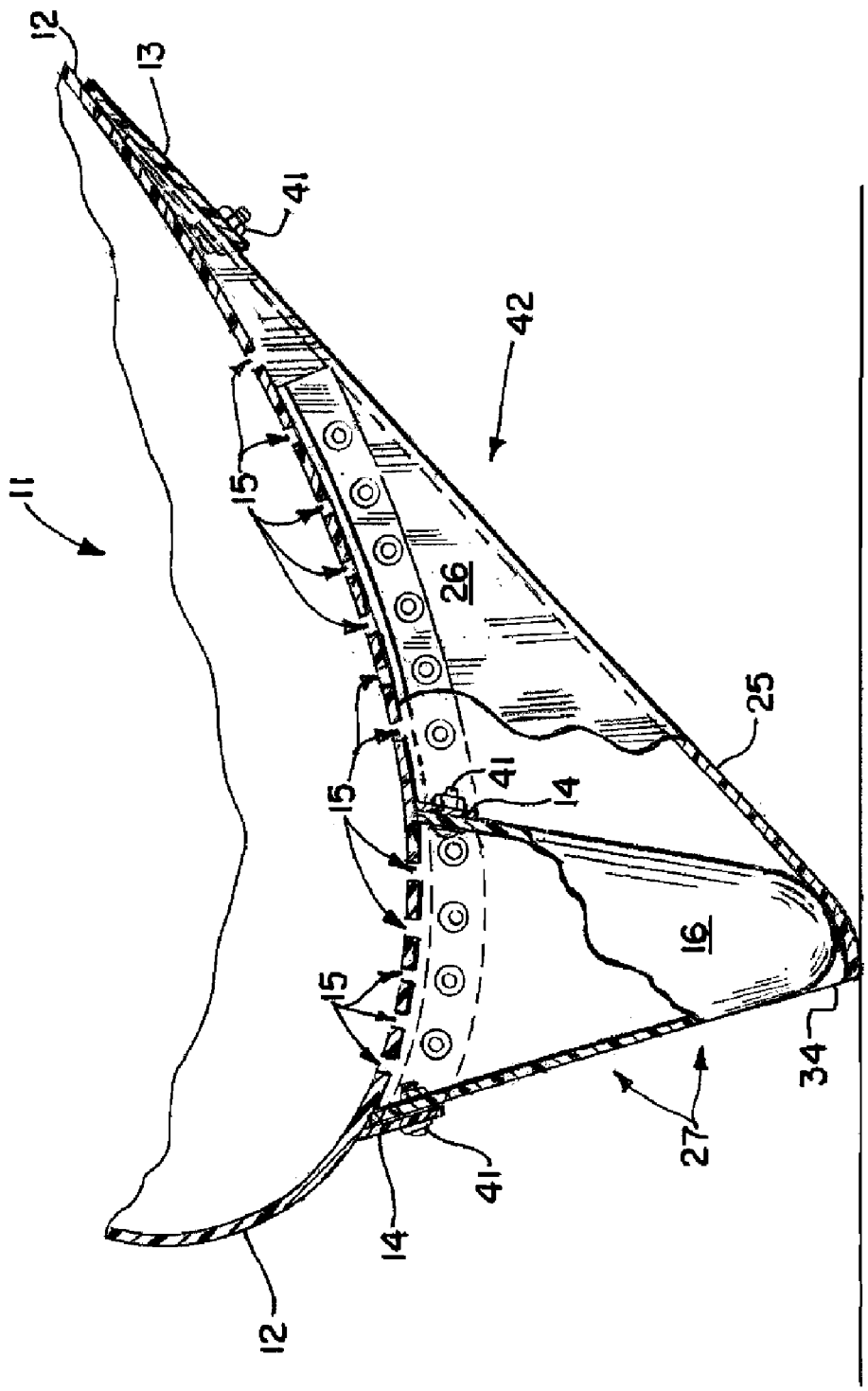
FIG. 13 is a partial sectional elevation view of the preferred embodiment of the apparatus of the present invention.
Figure 14:
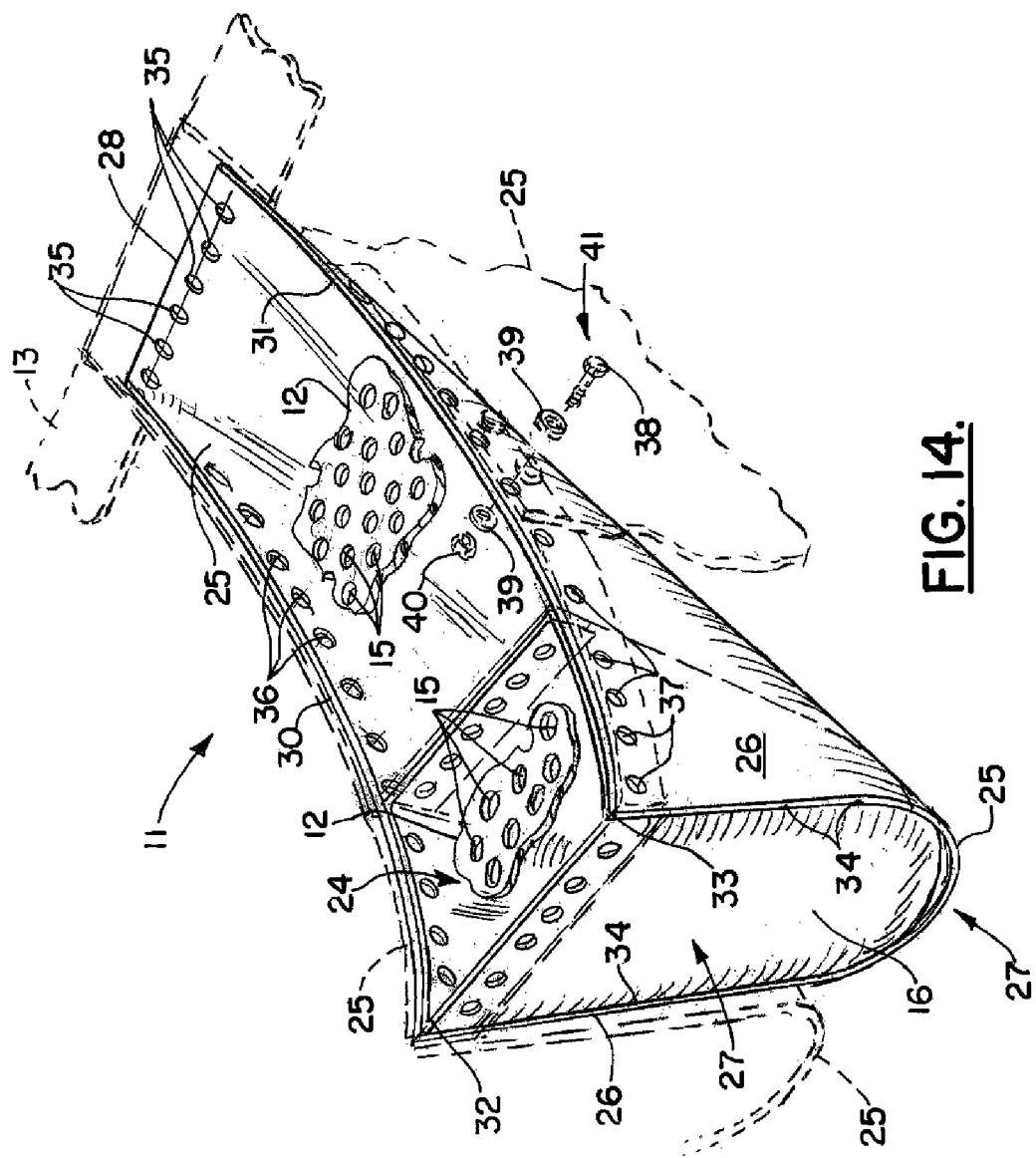
FIG. 14 is a perspective view of the preferred embodiment of the apparatus of the present invention.
Figure 15:
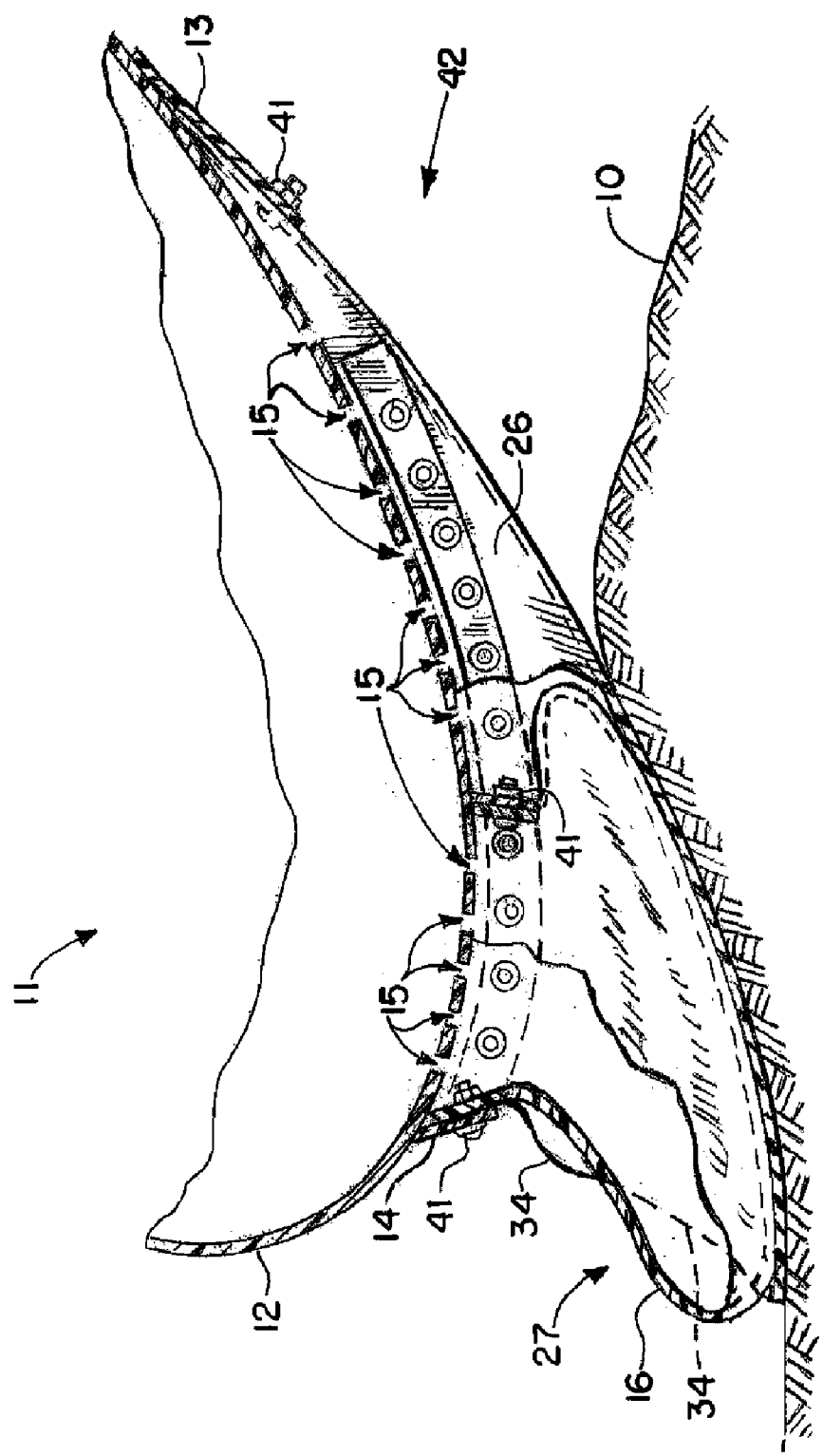
FIG. 15 is a partial sectional elevation view of the preferred embodiment of the apparatus of the present invention.

FIGS. 10-15 show the preferred embodiment of the apparatus of the present invention designated generally by the numeral 11 in FIGS. 13-15. Air cushion vehicle 11 provides a hull that can be any known hull such as hull 102 in FIG. 1. Such a hull 102 typically provides a deck 108.

Skirt bag 12 is fitted to hull 102 as is known in the art. Skirt bag 12 can provide forward flap 13 and a pair of rear flaps 14 (see FIGS. 13, 14 and 15). Openings 15 in skirt bag 12 can be used to inflate an inner cone 16 and an outer shaped finger 25.

Figure 10:
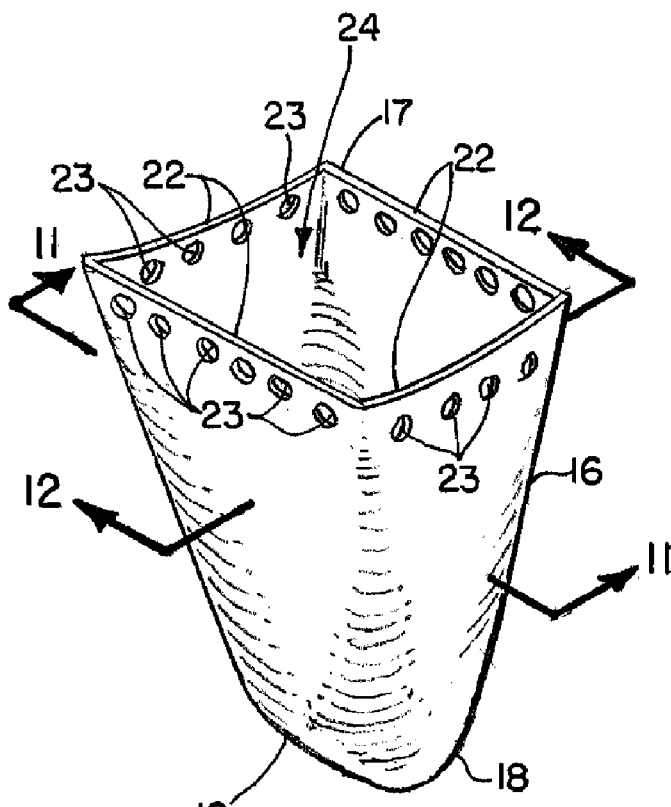
FIG. 10 is a partial perspective view of the preferred embodiment of the apparatus of the present invention.

Inner cone 16 is shown in more detail in FIGS. 10-12. Inner cone 16 can be generally cone shaped. The inner cone 16 has an upper end portion 17 and a lower end portion 18. Lower end portion 18 provides curved bottom wall 19. Sidewall 20 extends upwardly from curved bottom wall 19. The sidewall 20 can be a continuous sidewall as shown in FIGS. 10-12. A purpose of inner cone 16 is to inflate and "plug" the outer finger, not scoop, easily collapse, but be a stable inflated shape so it "re inflates" quickly after being collapsed.

Sidewall 20 and bottom wall 19 surround interior 21. Sidewall 20 provides an upper edge 22. A plurality of openings 23 are placed in sidewall 20 at the upper end portion 17 of inner cone 16, spaced just below edge 22 as shown in FIGS. 10-12.

The inner cone 16 thus provides an open top 24. This open top 24 is positioned to receive pressurized air from skirt bag 12 via openings 15 as shown in FIG. 13.

In FIGS. 13-15, an outer finger 25 attaches to skirt bag 12 and partially envelops inner cone 16 as shown more particularly in the drawings, FIGS. 10-15. Outer finger 25 has an outer finger wall 26 that is generally u-shaped. The outer finger 25 provides an open back 27. As shown in FIGS. 13-15, inner cone 16 is placed within outer finger 25 next to open back 27.

Outer finger 25 provides outer finger wall 26 that has a leading edge 28. The outer finger wall 26 provides side edges 30, 31 that are spaced apart. The outer finger 25 provides corners at 32, 33 and a rear edge 34 that can be generally u-shaped as shown in FIG. 14.

A plurality of forward openings 35 are provided in outer finger wall 26 just behind leading edge 28 as shown in FIG. 14. These openings enable outer finger wall 26 to be connected (for example, bolted) to flap 13 that depends downwardly from skirt bag 12 as shown in FIGS. 13-15.

Side openings 36, 37 are provided at the upper end portion of outer finger 25, next to side edges 30, 31 as shown in FIGS. 13-15. The side openings 36 are provided next to and just below side edge 30. Similarly, the side openings 37 are provided next to, and just below side edge 31.

A bolted connection 41 can be provided for bolting inner cone 16 to outer finger 25 and for bolting the assembly of one wrapped cone finger 42 to an adjacent wrapped cone finger 42. As used herein, the wrapped cone finger 42 includes the inner cone 16 and the outer finger 25. A bolted connection that includes bolt 38, washers 39 and nut 40 can be placed through openings 23 of inner cone 16, through aligned openings 36, 37 of outer finger 25, through aligned opening 36, 37 of outer finger 25 of adjacent wrapped cone finger 42 and through openings 23 of inner cone 16 of an adjacent wrapped cone finger 42.

A bolted connection 41 can thus be used to extend through four layers of material, namely the sidewall 20 of an inner cone 16, the outer finger wall 26 of the outer finger 25 that contains a first inner cone 16, the outer finger wall 26 of an adjacent outer finger 25 and the sidewall 20 of a second inner cone 16 contained within the adjacent outer finger 25. Bolted connections 41 can also be used to affix one outer finger wall 26 to the adjacent outer finger wall 26.

Inner cone 16 can be bolted to rear flaps 14 that depend from skirt bag 12 as shown in FIG. 13. The bolted connection 41 in FIG. 13 also demonstrates an attachment of leading edge 28 of outer finger wall 26 to forward flap 13 that depends from skirt bag 12.

In FIG. 15, the preferred embodiment of the apparatus of the present invention 11 is shown as partially deflated when the wrapped cone finger 42 meets a wave or other object 10. The outer finger wall 26 protectively encapsulates inner cone 16. Open back 27 allows the inner cone 16 to deflect rearwardly beyond edge 34 and thus avoid rupture or other damage.

Figure 16:
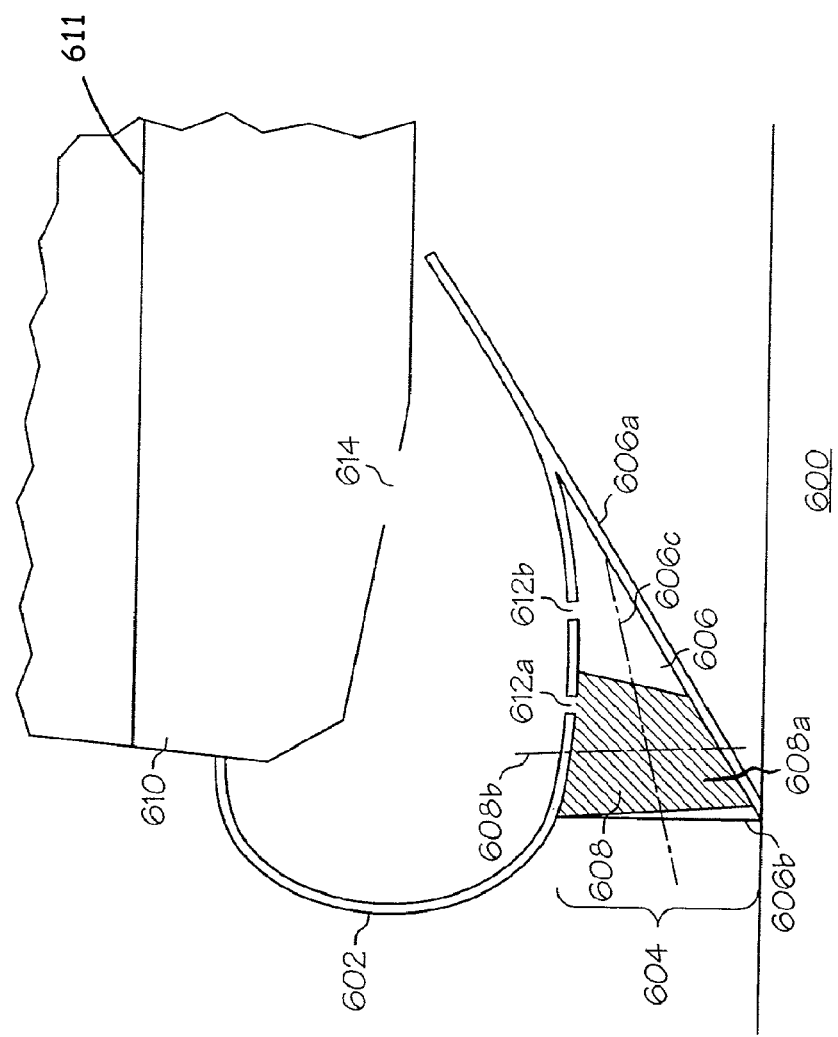
FIG. 16 shows a partial sectional elevation view of an alternate embodiment of the present invention including a wrapped-cone air cell or finger.
Figure 18:
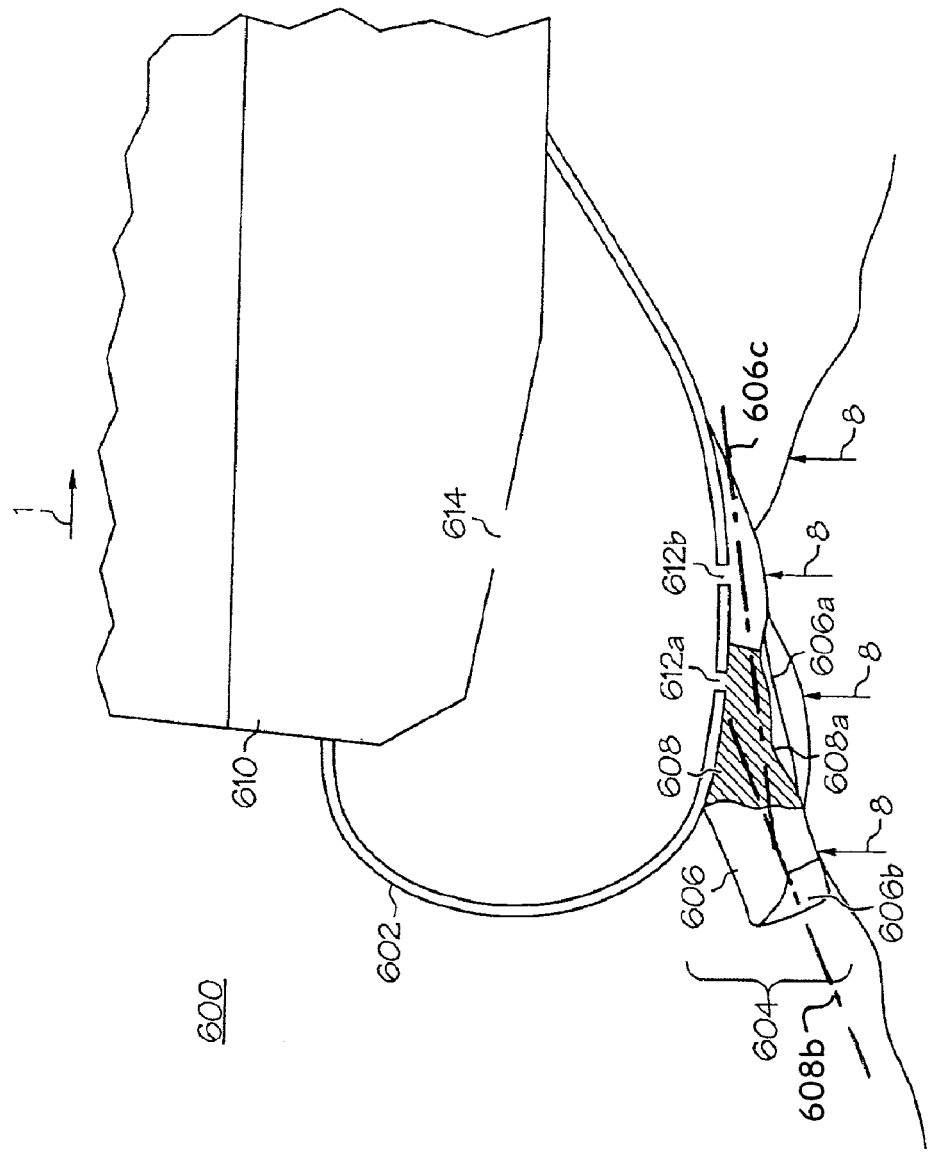
FIG. 18 shows a partial sectional elevation view of the wrapped-cone finger of FIG. 16 with forward direction of ACV toward the bow indicated.

FIG. 16 shows an alternate embodiment of the apparatus of the present invention, designated generally by the numeral 600 in FIGS. 16 and 18. Marine air cushion vehicle 600 provides a hull 610 with an attached skirt bag 602. Hull 610 may provide a cargo deck 611 that can receive vehicles to be transported such as trucks, tanks or the like or other cargo. A plurality of wrapped cone air cells or fingers 604 are attached to skirt bag 602. The wrapped-cone finger 604 may include an outer finger 606 of flexible material that "wraps" or generally encloses an inner finger 608 of flexible material. The outer finger 606 may be attached to a skirt bag 602 as part of an air-cushion vehicle (ACV) skirt system. In certain embodiments, the outer finger may be attached to an intermediate attachment structure or finger flap (not shown) that is attached to the skirt bag 602. The outer finger 606 may include an inner face or edge 606a and an opening or open back face 606b. The inner finger 608 may have a lower opening 608a. The wrapped-cone finger 604 may be located at the stern or stern corners of a skirt bag in certain embodiments. The skirt bag 602 may be inflated by suitable means. For example, the skirt bag may be inflated with air from one or more air ducts 614 receiving air from fans located on a deck 611 of the ACV.

The outer finger 606 may have an outer finger longitudinal axis 606c substantially along the midline of the volume or interior defined by the outer finger 606 surface. The inner finger 608 may have an inner finger longitudinal axis 608b. When the wrapped-cone finger 604 is in an inflated state, the inner finger longitudinal axis 608b may be in a first position relative to the outer finger longitudinal axis 606c. In certain embodiments, the first position of the inner finger longitudinal axis 608b may be substantially perpendicular or not parallel to the outer finger longitudinal axis 606c, for example as shown in FIG. 16. When the wrapped-cone finger 604 is in a deflated state, for example as shown in FIG. 18, the inner finger longitudinal axis 608b may be in a second position with respect to the outer finger longitudinal axis 606c. In certain embodiments, the second position of the inner finger longitudinal axis 608b may be more acute or more closely parallel to the outer finger longitudinal axis 606c when compared to the first position. It should be understood that the respective inner and outer fingers, including the respective longitudinal axes, may bend or deform as the respective inner and outer fingers move and/or deform in shape during usage.

Any suitable materials may be used for the skirt bag 602 and wrapped-cone finger 604. For example, the skirt bag 602 and wrapped-cone finger 604 may be made from materials including but not limited to elastomer-coated fabrics. In certain embodiments, a Type I Rubber Coated Fabric, Part No. 50000010, made by Bell Avon, Inc. of 1200 Martin Luther King Jr. Blvd, Picayune, Miss. 39466 may be used. Suitable coatings may include but are not limited to polybutadiene or natural rubber. In certain other embodiments, neoprene or natural rubber coated nylon may be used for a wrapped-cone finger 604. The thickness of any coating and amount of plies and density of the base, e.g., nylon fabric, may be adapted to a particular application. For example, the thickness of the base and the number of base plies may be selected based on design parameters such as finger size, ACV speed, cushion pressure, and weight of the ACV.

With continued reference to FIG. 16, the inner finger 608 may receive air through an inner finger feed hole 612a located in the wall of the skirt bag 602. During the inflation, the inner finger lower opening 608a may be sealed or substantially sealed by the inner face 606a of the outer finger 606. As the inner finger 608 becomes inflated, it obstructs or blocks the passage of air out of the open back face 606b of the outer finger 606, creating a pressure differential between the interior of the outer finger 606 and the ambient environment. In certain embodiments, the outer finger 606 may receive air through one or more outer finger feed holes 612b. A feed duct 614 is shown in the hull 610 for the inflation of the skirt bag 602.

Figure 17:
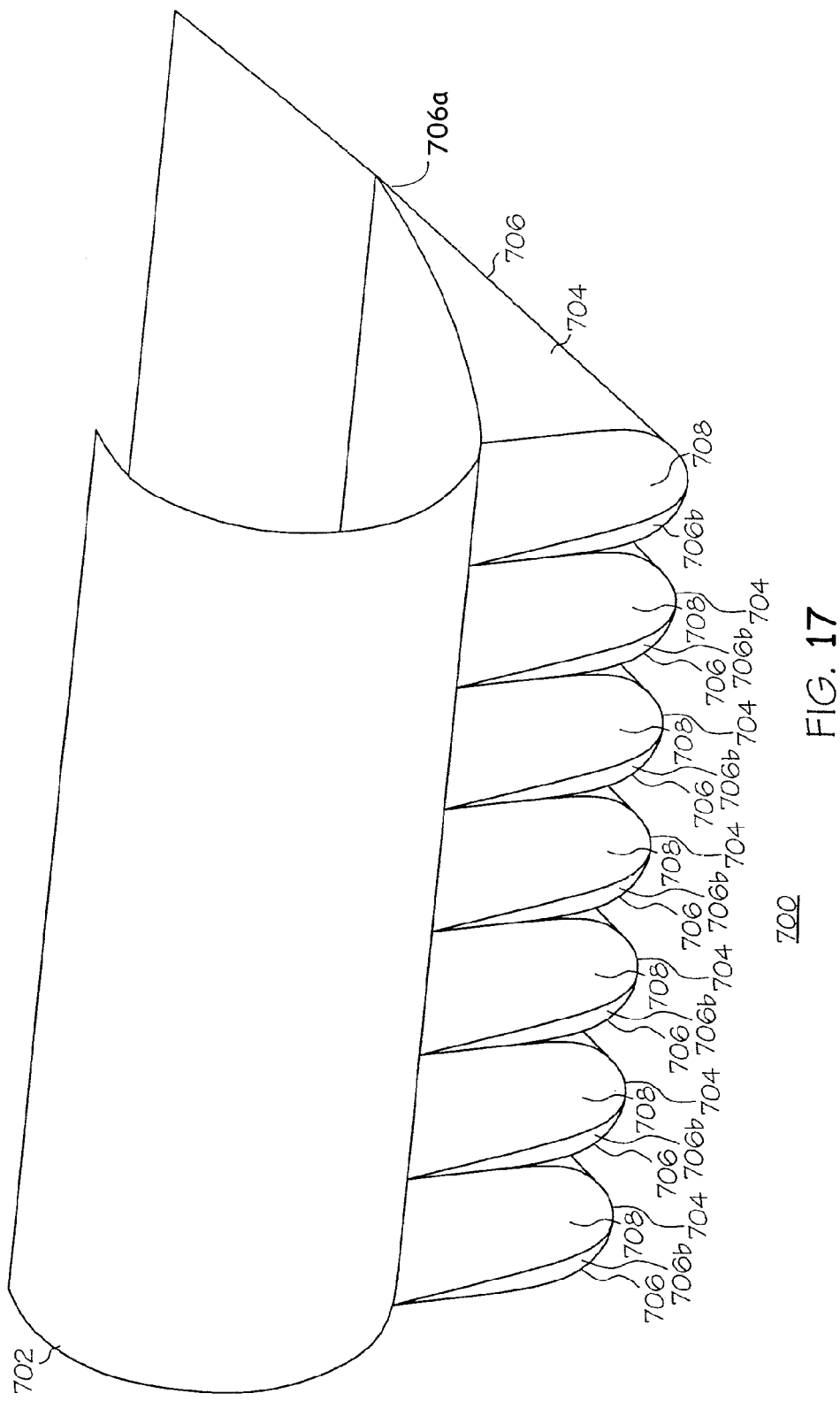
FIG. 17 is a perspective view of a stern portion of a skirt system with wrapped-cone fingers according to the alternate embodiment.

FIG. 17 is a perspective view of a stern portion of a skirt system 700 with wrapped-cone fingers according to one embodiment. The skirt system 700 may include a skirt bag 702 and one or more wrapped-cone fingers 704. The wrapped-cone fingers 704 may each include an outer finger 706 and an inner finger 708. An outer finger 706 may include a leading edge or face 706a and an open back face 706b. Each inner finger 708 may be located within the interior of an outer finger 706. When inflated as shown, each inner finger 708 may block the open back face 706b of the associated outer finger 706.

Referring to FIG. 18, use of an embodiment of the present invention will now be described. FIG. 18 shows a partial sectional elevation view of the wrapped-cone finger 604 of FIG. 16 with forward direction 1 toward the bow indicated. The wrapped-cone finger 604 is shown in a collapsed state due to the impact of a wave 8. During the operation of an associated ACV over a water surface, the force of the impacting wave 8 may cause wrapped-cone finger to deflate, e.g., by causing air to exit through the inner finger opening 608a and the open back face 606b.

When a wave 8 hits or impacts the inner face 606a of the wrapped-cone finger 604, the outer finger 606 sweeps back and the inner finger 608 collapses. After the wave 8 passes, the inner finger 608 reinflates with air forced through the one or more inner finger feed holes 612a, thereby closing the open back face 606b of the outer finger 606 and allowing the wrapped-cone finger 604 to reinflate. The inflation of the wrapped-cone finger 604 with air from the skirt bag 602 and air duct 614 may be further facilitated by an optional outer finger feed hole 612b. The outer finger feed hole 612b may open into the outer finger 606 at a location between the inner finger 608 and inner face 606a.

Because the wrapped-cone finger 604 does not have an attached back-face, forces on the inner face 606a due to impacting waves tend to collapse the outer finger 606 and angle or sweep the inner finger 608 backward within the wrapped-cone finger 604. As the inner finger 608 sweeps backward, air is pushed out of the wrapped-cone finger 604 through the inner finger lower opening 608a and the open back face 606b of the outer finger 606. When the wrapped-cone finger 604 is deflated by an impacting wave in this manner, scooping may be minimized or avoided altogether. The lack of any stiffeners minimizes or prevents snagging and allows the wrapped-cone finger 604 to be light-weight.

Figure 19:
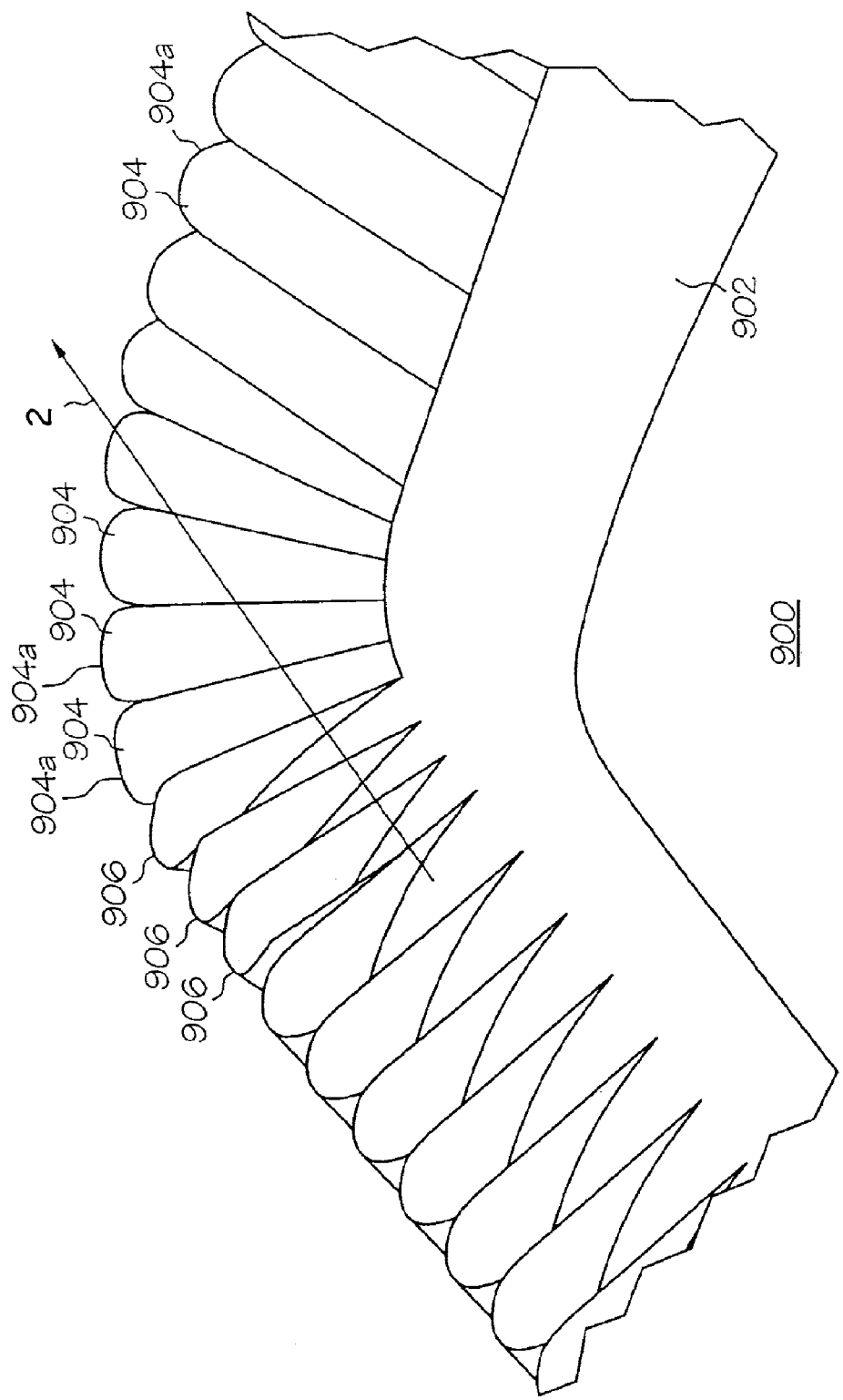
FIG. 19 shows the underside of a skirt system according to the alternate embodiment.

FIG. 19 shows the underside of a skirt system 900 according to one embodiment. The skirt system 900 may include wrapped-cone fingers 904 at the stern and stern corner areas of an associated skirt bag 902 and open fingers 906 at the port and starboard sides of skirt bag 902. Water surface flow direction 2 is indicated for movement of the related ACV and skirt system 900 toward or in front of the ACV bow.

Figure 5:
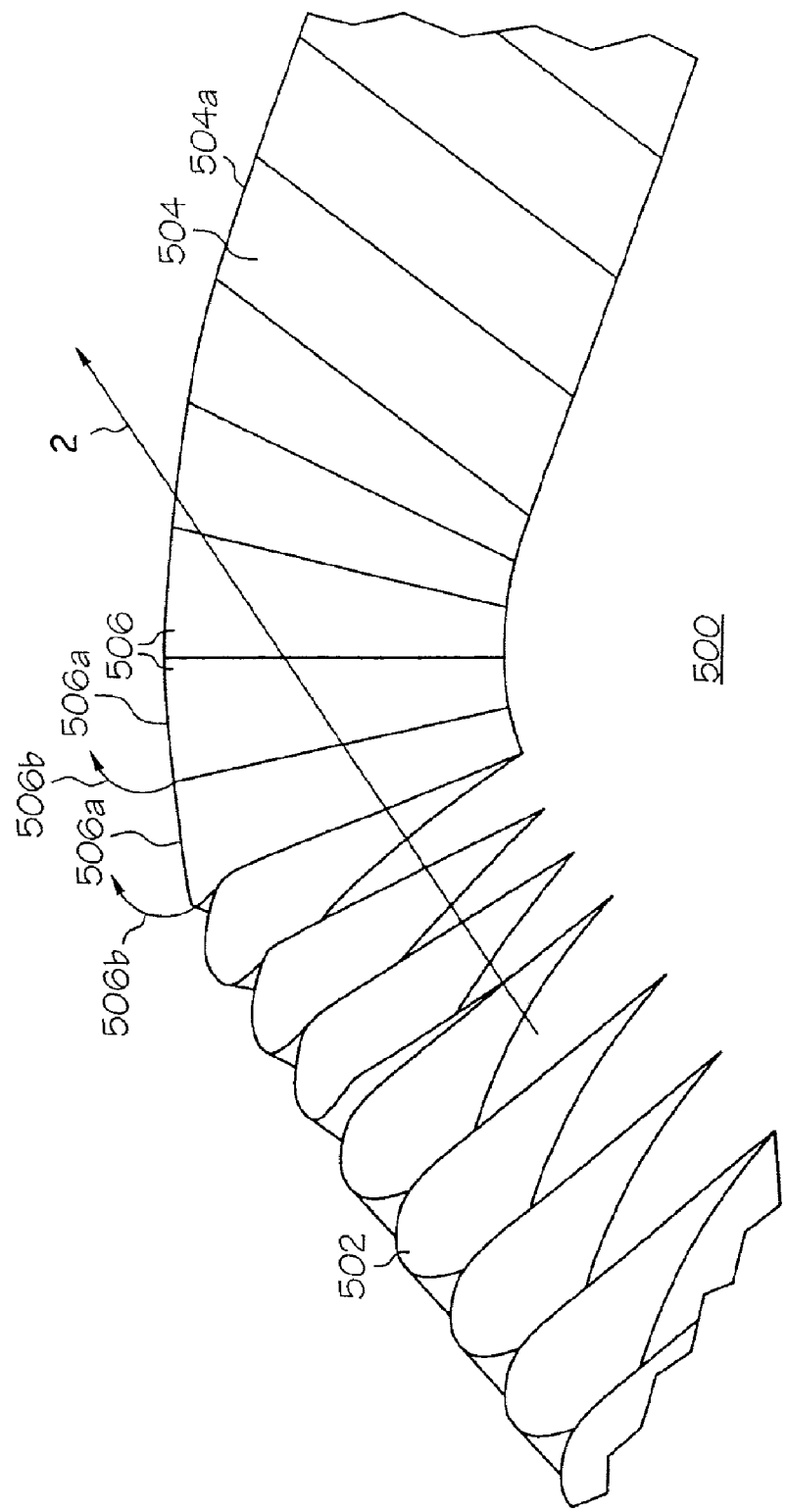
FIG. 5 shows the underside of a stern corner of prior art ACV skirt system having fingers with stiffening elements.
Figure 6:
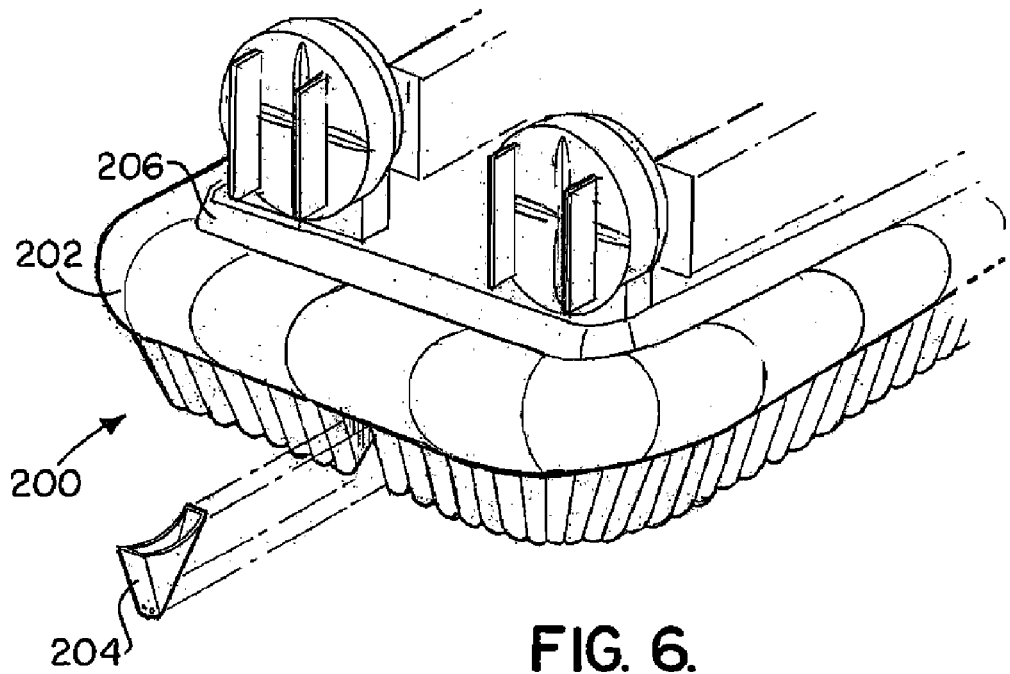
FIG. 6 is a partial perspective view of a prior art air cushion vehicle showing the prior art skirt system of FIG. 2.
Figure 7:
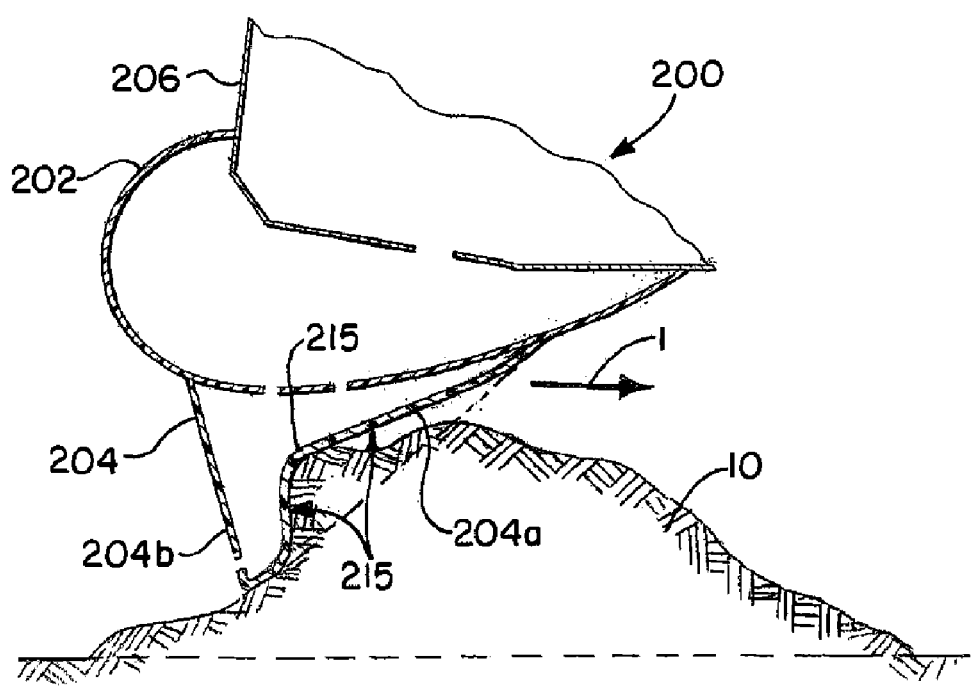
FIG. 7 is a partial sectional elevation view of the prior art skirt system shown in FIGS. 2 and 6.
Figure 8:
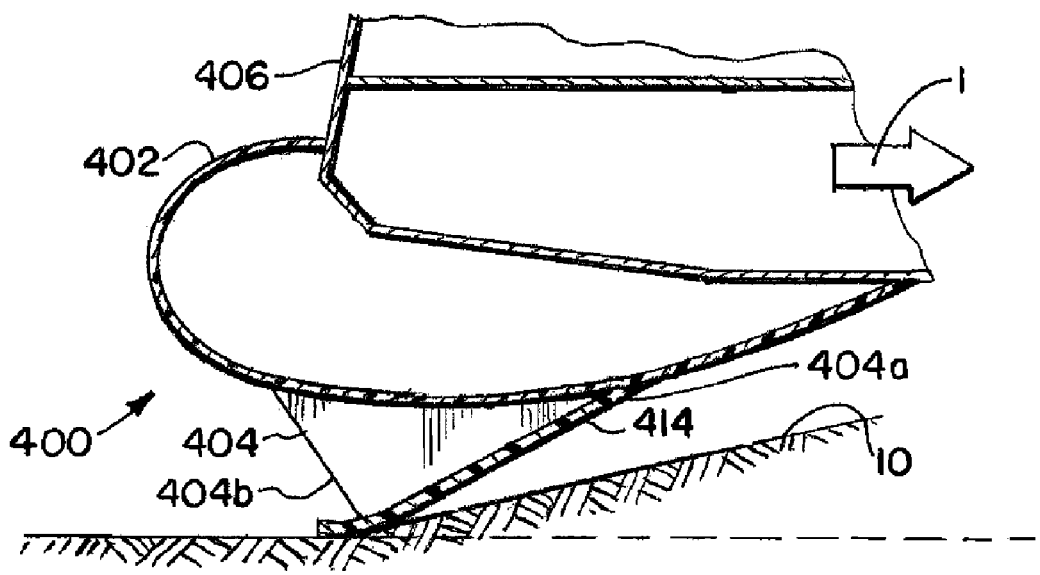
FIG. 8 is a partial sectional elevation view of a prior art skirt system also shown in FIGS. 4, 4A, 4B.
Figure 9:
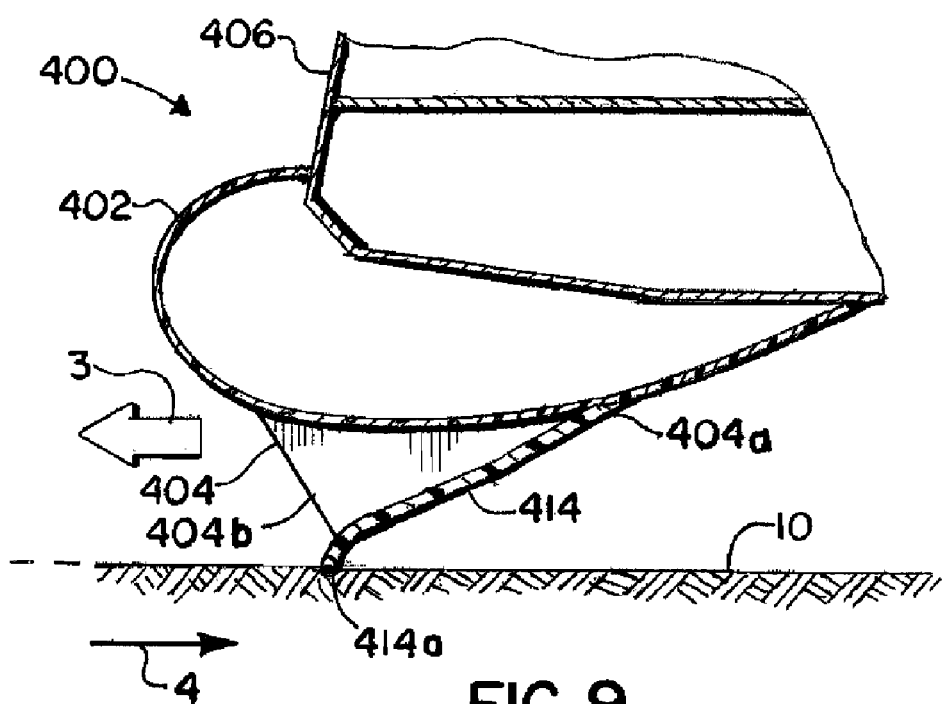
FIG. 9 is a partial sectional elevation view of a prior art skirt system also shown in FIGS. 4, 4A, 4B.

The wrapped-cone fingers 904 may be installed or located in stern corner areas of an associated skirt bag without the inherent problems of stiffening elements, e.g., 506a of figure 5, misaligned to the ACV direction. Compared to fingers having stiffening elements, e.g., fingers 506 with stiffening elements 506a shown in FIG. 5, an outer edge 904a of a wrapped-cone finger 904 may have a more rounded interface with the water surface flow 2. Consequently, the wrapped-cone fingers 904 are resistant to twisting and displacement when water flows across the finger 904. Problems described above regarding prior art skirt systems and fingers, e.g., twisting and drag, may consequently be minimized or eliminated.

Figure 20:
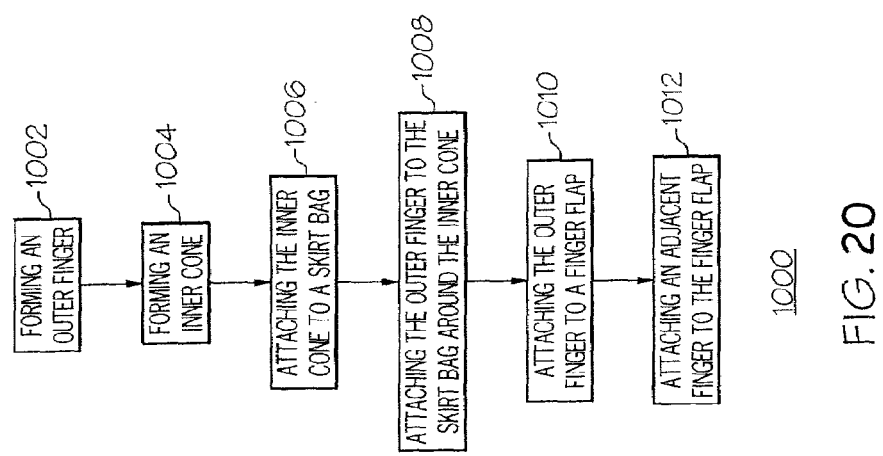
FIG. 20 shows steps in a method of manufacturing a wrapped-cone finger for use in a skirt system.

FIG. 20 shows steps in a method 1000 of manufacturing a wrapped-cone finger for use in a skirt system. An outer finger of flexible fabric may be formed 1002. An inner cone of flexible fabric may be formed 1004. The inner cone may have an inner cone lower opening. The outer finger may have an open back face. The inner cone may be attached 1006 to a skirt bag for use on an air cushioned vehicle (ACV). The outer finger may be attached 1008 to the skirt bag around the inner cone, thereby forming a wrapped cone finger. The outer finger may optionally be attached 1010 to a finger flap acting as an intermediate attachment structure between the skirt bag and the outer finger. An adjacent finger for use in a skirt system of an ACV may be attached 1012 to the finger flap. The adjacent finger may include a wrapped-cone finger.

Accordingly, embodiments of the present invention may provide wrapped-cone fingers and skirt systems that have advantages over the prior art. In certain embodiments, wrapped-cones fingers may be lower in cost and lighter in weight than typical fingers. Wrapped-cone fingers may be located at desired portions or locations of a skirt bag for an air cushioned vehicle (ACV) including, for non-limiting example, the stern and stern corner portions of a skirt bag. Embodiments may eliminate the need for stiffeners or planing elements for certain types of fingers, e.g., stern fingers and stern corner fingers. Wrapped-cone fingers may also be installed in corners portions or areas of a skirt bag without the inherent problems of stiffener elements being misaligned to the craft direction. In certain embodiments, stern fingers may be created that have low-drag, stable shapes that minimize or prevent the scooping of water.

Wrapped-cone fingers of certain embodiments may be suitable for implementation or retrofit on existing air-cushion vehicles (ACVs) and associated skirt systems. For example, wrapped-cone fingers according to the present invention may be suitable for implementation on ACVs including, but not limited to, the Landing Craft, Air Cushion (LCAC) used by the U.S. Navy.

Failure modes for certain embodiments may be a gradual wearing out of the outer finger or cone material, and then wearing out the bottom of the inner cone due to abrasion and flagellation. In the case that failure of an individual wrapped-cone finger occurs, undue damage to adjacent fingers or skirt bag areas may be minimized or prevented. Embodiments may also provide improved longevity for skirt systems and ease of repair may be increased by localized spot repair, e.g., the application of patches, to portions of the wrapped-cone outer and inner assemblies.

Although the present invention has been described in considerable detail with reference to certain preferred version thereof, other versions are possible. For example, while the previous description has described use of wrapped-cone fingers at stern and stern corner locations of ACV skirt systems, wrapped-cone fingers may be used at other locations of skirt systems in certain embodiments.

The reader's attention is directed to all papers and documents that are filed concurrently with this specification and which are open to public inspection with this specification, and the contents of all such papers and documents are incorporated herein by reference. All the features disclosed in this specification, including any accompanying claims, abstract, and drawings, may be replaced by alternative features serving the same, equivalent or similar purpose, unless expressly stated otherwise. The following is a list of parts and materials suitable for use in the present invention.

PARTS LIST

Part Number Description 1 arrow (forward direction)
2 arrow (water surface direction)
3 arrow (reverse direction)
4 arrow (terrain direction)
8 wave
10 wave/object/terrain surface
11 air cushion vehicle
12 skirt bag
13 forward flap
14 rear flap
15 opening
16 inner cone
17 upper end portion
18 lower end portion
19 curved bottom wall
20 sidewall
21 interior
22 edge
23 opening
24 open top
25 outer finger
26 outer finger wall
27 open back
28 leading edge
30 side edge
31 side edge
32 corner
33 corner
34 rear edge
35 forward opening
36 side opening
37 side opening
38 bolt
39 washer
40 nut
41 bolted connection
42 wrapped cone finger
100 skirt system
102 hull
106 skirt bag
106a bow section
106b port side section
106c stern section
106d starboard side section
108 deck
110 finger
110a open finger
110b closed finger
200 skirt system
202 skirt bag
204 closed finger
204a inner face or edge
204b cone portion
204c back face
206 hull
208 inner face angle
214 perimeter
215 scoop
400 skirt system
402 skirt bag 404 closed finger
404a inner face
404b cone portion
406 hull
414 stiffener (planer element)
414a stiffener tip
500 skirt system
502 finger
504 stern finger
504a stiffening element (planer element)
506 stern corner finger
506a stiffening element (planer element)
506b arrow (displacement)
600 marine air cushion vehicle
602 skirt bag
604 wrapped cone finger
606 outer finger
606a inner face
606b open back face
606c longitudinal axis
608 inner finger
608A lower opening
608B longitudinal axis
610 hull
611 deck
612a inner finger feed hole
612b outer finger feed hole
614 air duct
700 skirt system
702 skirt bag
704 wrapped cone finger
706 outer finger
706a inner face
706b open back face
708 inner cone finger
900 skirt system
902 skirt bag
904 wrapped cone finger
904a outer edge
906 open finger
1000 method of manufacture
1002 outer finger formed
1004 inner cone formed
1006 inner cone attached
1008 outer finger attached
1010 finger flap attachment
1012 adjacent finger attachment All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A wrapped-cone finger for an air-cushion vehicle skirt system comprising:
   a) an outer inflatable finger having an outer finger surface having an outer finger opening;
   b) an inner inflatable finger disposed within said outer finger; and
   c) wherein said inner inflatable finger is operable to move from an inflated state where said outer finger opening is substantially blocked by said inner inflatable finger to a deflated state where said outer finger opening is not substantially blocked by said inner inflatable finger; and
   d) flow channels that supply air to the outer inflatable finger and the inner inflatable finger, one of the flow channels inflating the inner inflatable finger, the other flow channel inflating the outer finger and positioned in between the inner inflatable finger and the leading edge of the other inflatable finger.

2. The wrapped-cone finger of claim 1, further comprising an inner inflatable finger opening that enables the inner inflatable finger to be inflated via the opening.

3. The wrapped-cone finger of claim 1, further comprising a skirt bag having a skirt bag surface and wherein said outer finger surface further comprises an outer finger attachment perimeter for connection to the skirt bag surface.

4. The wrapped-cone finger of claim 3, wherein said skirt bag surface is attached to said outer finger attachment perimeter.

5. The wrapped-cone finger of claim 1, further comprising a skirt bag having a skirt bag surface and wherein said inner inflatable finger further comprises an inner inflatable finger attachment perimeter for connection to the skirt bag surface.

6. The wrapped-cone finger of claim 1, wherein the outer finger is comprised of a flexible material.

7. The wrapped-cone finger of claim 6, wherein the flexible material is an elastomer.

8. The wrapped-cone finger of claim 6, wherein the flexible material is natural rubber.

9. The wrapped-cone finger of claim 6, wherein the flexible material is a rubber-coated fabric.

10. The wrapped-cone finger of claim 9, wherein the rubber-coated fabric is coated with polybutadiene.

11. The wrapped-cone-finger of claim 6, wherein the flexible material includes a nylon base fabric.

12. The wrapped-cone finger of claim 11, wherein the nylon base fabric includes one or more plies of nylon fabric.

13. The wrapped-cone finger of claim 1, wherein said outer finger includes an outer finger longitudinal axis and said inner inflatable finger includes an inner cone longitudinal axis, wherein in said inflated state said inner cone longitudinal axis is in a first position with respect to said outer finger longitudinal axis, and wherein in said deflated state said inner cone longitudinal axis is in a second position with respect to said outer finger longitudinal axis.

14. The wrapped-cone finger of claim 13, wherein said first position of said inner cone longitudinal axis is substantially perpendicular to said outer finger longitudinal axis.

15. The wrapped-cone finger of claim 13, wherein said second position of said inner cone longitudinal axis is substantially parallel to said outer finger longitudinal axis.

16. An air cushion vehicle (ACV) skirt system comprising:
   a) a hull;
   b) a skirt bag attached to the hull; and
   c) a plurality of fingers attached to and depending from said skirt bag, wherein said plurality of fingers includes one or more wrapped-cone fingers having an inner cone placed within an outer finger said outer finger having a leading edge; and
   d) separate flow channels that supply air to the outer inflatable finger and the inner inflatable cone, one of the flow channels inflating the inner inflatable cone, the other flow channel inflating the outer finger.

17. The system of claim 16, wherein each of said one or more wrapped-cone fingers comprises:
   a) an outer finger having an outer finger surface defining an outer finger opening and an outer finger interior having an outer finger longitudinal axis;
   b) an inner cone disposed within said outer finger interior, said inner cone having an inner cone longitudinal axis that is not parallel to said outer finger longitudinal axis when said inner cone is in an inflated state.

18. The system of claim 17, wherein said inner cone further comprises an inner cone opening.

19. The system of claim 17, wherein said outer finger further comprises an outer finger attachment perimeter for connection to a surface of said skirt bag.

20. The system of claim 17, wherein said outer finger comprises a flexible material.

21. The system of claim 17, wherein said one or more wrapped-cone fingers are located at a stem portion of said skirt bag.

22. The system of claim 17, wherein said one or more wrapped-cone fingers are located at a stern corner portion of said skirt bag.

23. An air cushion vehicle (ACV) skirt system comprising:
 a) a hull;
 b) a skirt bag attached to the hull;
 c) a plurality of fingers attached to and depending from said skirt bag, wherein said plurality of fingers includes one or more wrapped-cone fingers having an inner cone placed within an outer finger;
 d) wherein each of said one or more wrapped-cone fingers comprises:
  i) an outer finger having an outer finger surface defining an outer finger opening and an outer finger interior having an outer finger longitudinal axis; and
  ii) an inner cone disposed with said outer finger interior, said inner cone having an inner cone longitudinal axis that is not parallel to said outer finger longitudinal axis when said inner cone is in an inflated state; and
 e) wherein said inner cone further comprises an inner cone attachment perimeter for connection to a surface of said skirt bag.

24. An air cushion vehicle (ACV) skirt system comprising:
 a) a hull;
 b) a skirt bag attached to the hull;
 c) a plurality of fingers attached to and depending from said skirt bag, wherein said plurality of fingers includes one or more wrapped-cone fingers having an inner cone placed within an outer finger;
 d) wherein each of said one or more wrapped-cone fingers comprises:
  i) an outer finger having an outer finger surface defining an outer finger opening and an outer finger interior having an outer finger longitudinal axis; and
  ii) an inner cone disposed with said outer finger interior, said inner cone having an inner cone longitudinal axis that is not parallel to said outer finger longitudinal axis when said inner cone is in an inflated state
 e) wherein said outer finger further comprises an outer finger attachment perimeter for connection to a surface of said skirt bag; and
 f) wherein said outer finger attachment perimeter comprises a finger flap.

\* \* \* \* \*